United States Patent [19]

Logan et al.

[11] 4,361,332
[45] Nov. 30, 1982

[54] ROTATABLE SEAL ASSEMBLY

[75] Inventors: Clinton M. Logan, Pleasanton; Jack L. Garibaldi, Livermore, both of Calif.

[73] Assignee: The United States of America as represented by the United States Department of Energy, Washington, D.C.

[21] Appl. No.: 206,233

[22] Filed: Nov. 12, 1980

[51] Int. Cl.³ .................. B01J 17/00; F16J 15/40
[52] U.S. Cl. .......................... 277/3; 277/226; 308/160
[58] Field of Search ............ 308/160; 277/226, 3, 277/DIG. 8

[56] References Cited

U.S. PATENT DOCUMENTS

| 4,118,042 | 10/1978 | Booth | 277/226 |
| 4,191,385 | 3/1980 | Fox | 277/3 |
| 4,268,044 | 5/1981 | Killian et al. | 277/DIG. 8 |
| 4,287,758 | 9/1981 | Swearingen | 308/160 |

FOREIGN PATENT DOCUMENTS

| 753135 | 2/1967 | Canada | 277/DIG. 8 |
| 1219607 | 1/1971 | United Kingdom | 277/DIG. 8 |

Primary Examiner—Robert I. Smith

[57] ABSTRACT

An assembly is provided for rotatably supporting a rotor on a stator so that vacuum chambers in the rotor and stator remain in communication while the chambers are sealed from ambient air, which enables the use of a ball bearing or the like to support most of the weight of the rotor. The apparatus includes a seal device mounted on the rotor to rotate therewith, but shiftable in position on the rotor while being sealed to the rotor as by an O-ring. The seal device has a flat face that is biased towards a flat face on the stator, and pressurized air is pumped between the faces to prevent contact between them while spacing them a small distance apart to avoid the inflow of large amounts of air between the faces and into the vacuum chambers.

8 Claims, 3 Drawing Figures

ROTATABLE SEAL ASSEMBLY

ORIGIN OF THE INVENTION

The Government of the United States of America has rights in this invention pursuant to Department of Energy Contract No. W-7405-ENG-48.

BACKGROUND OF THE INVENTION

A rotor and stator that have chambers that are in communication with one another but which must be sealed from the outside environment, require a rotating bearing and seal that enables rotation of the rotor while sealing it against the stator. One application for such a seal is in accelerator beam experiments wherein a particle beam generated in a stationary housing is to strike a rapidly rotating target, and with the beam and target being maintained in a high vacuum. U.S. Pat. No. 4,118,042 by Rex Booth entitled Air Bearing Vacuum Seal Assembly, describes an arrangement whereby the rotor can be rotated at high speed while minimizing the entrance of air into the communicating vacuum chambers of the rotor and stator. The patent describes an arrangement wherein the rotor is supported on the stator solely by air bearings. The air bearings maintain a very small space between bearing faces on the rotor and stator to minimize the flow of air through the space into the vaccum chambers. Furthermore, the patent describes the use of air outlets in the bearing faces to draw away pressure air that slightly separates the faces and that might otherwise leak into the vaccum chambers. While such an arrangement can enable precision rotation of the rotor at high speeds while reducing air leakage into the vacuum chambers to a low level, it has disadvantages. One disadvantage is that air bearings of moderate size cannot easily support large loads, as where the rotor has considerable overhanging weight. In addition, a conical air bearing portion that provides radial thrust, adds substantially to the cost of the assembly.

OBJECTS AND SUMMARY OF THE INVENTION

One object of the present invention is to provide a rotatable seal assembly that utilizes a ball bearing or other high capacity-low cost bearing to provide most of the support of the rotor on the stator, while also minimizing the leakage of ambient air into sealed chambers of the stator and rotor that are in communication.

Another object is to provide a rotatable seal assembly which utilizes an air bearing technique to seal adjacent parts of the rotor and stator while avoiding direct contact between them, which utilizes a separate more conventional bearing to provide most of the support of the rotor on the stator.

Another object is to provide a high speed rotating vacuum seal assembly for use in rotating targets that are to be bombarded with a particle beam generated from a largely stationary source.

In accordance with one embodiment of the present invention, a rotatable seal assembly is provided which enables bearing support of the rotor on the stator, independently of the sealing device that minimizes the entrance of air into the communicating chambers in the stator and rotor. The assembly includes a bearing, such as an ordinary ball bearing device, which rotatably supports the rotor member on the stator member, and a separate seal device mounted on one of the members such as the rotor and being slightly shiftable in position thereon. A seal device shiftably mounted on the rotor to rotate therewith, has a face lying adjacent to a substantially mating face on the stator, and the seal device is biased towards the stator face to minimize the passage of air between them. Air can be pumped between the faces to slightly separate them so as to avoid contact during rotation while keeping them very slightly separated. Thus, most of the load of the rotor is supported by a moderate cost-high capacity bearing such as a ball bearing device, while the apparatus for sealing the rotor to the stator is separate and does not require large load bearing capacity.

The novel features of the invention are set forth with particularity in the appended claims. The invention will best be understood from the following description when read in conjunction with the accompanying drawings.

DESCRIPTION OF THE PREFERRED EMBODIMENT

Figure 1:
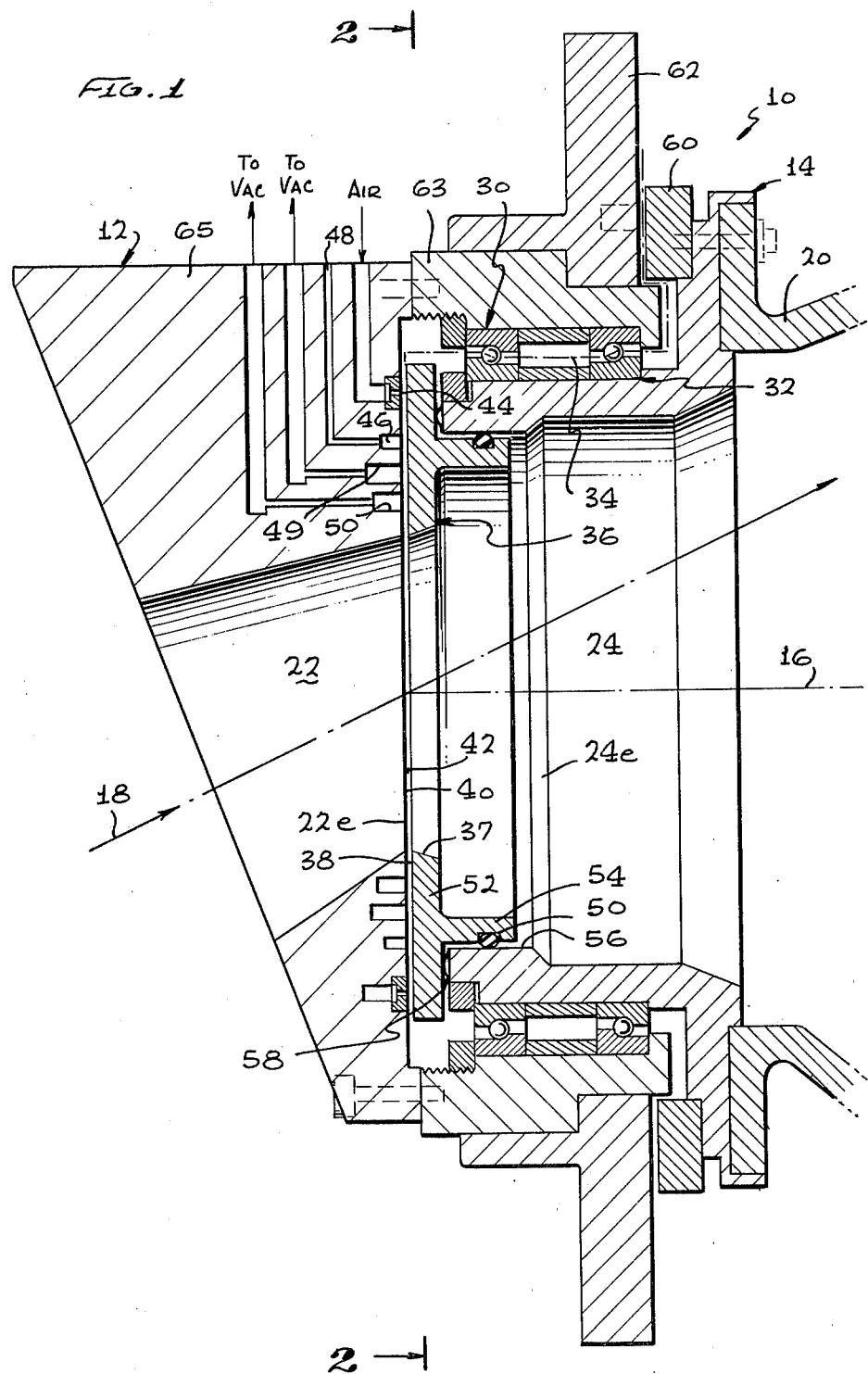
FIG. 1 is a sectional view of a rotatable seal assembly constructed in accordance with the present invention.
Figure 2:
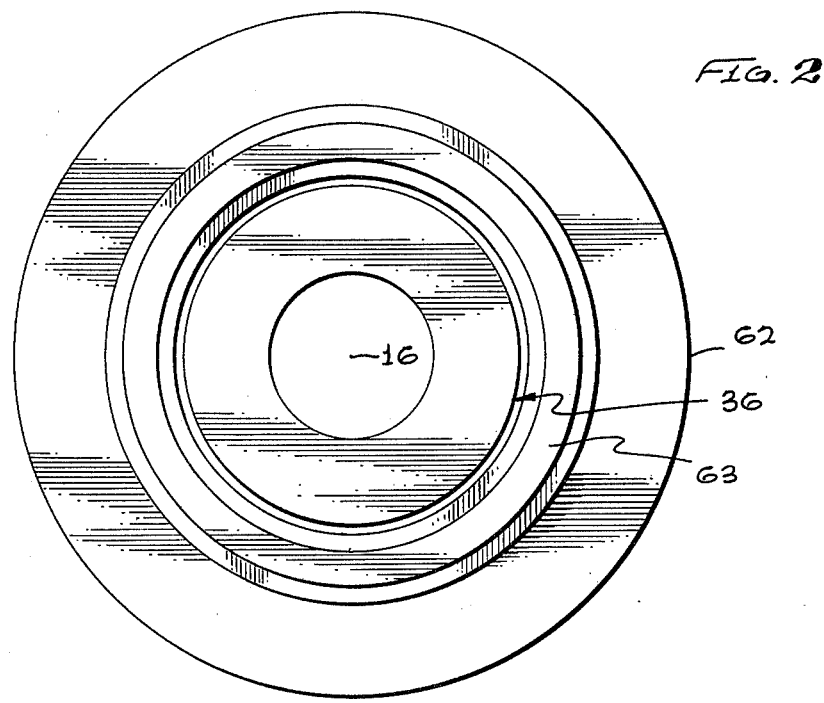
FIG. 2 is a view taken on the line 2—2 of FIG. 1.
Figure 3:
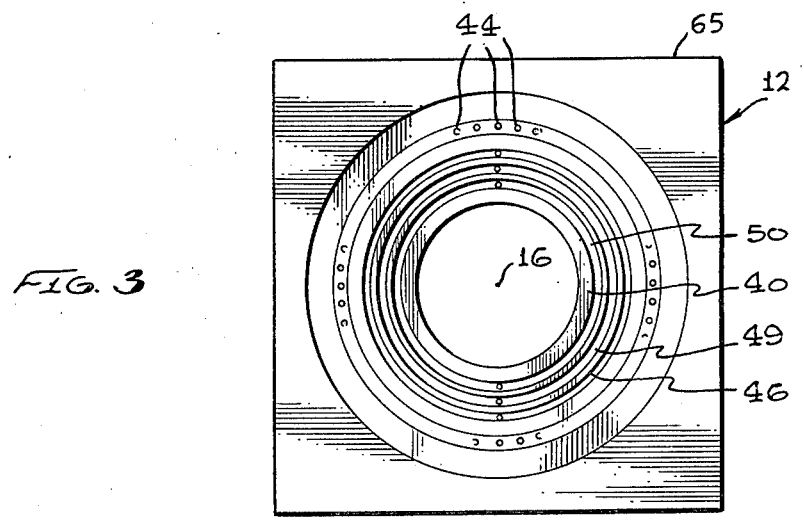
FIG. 3 is an end view of a portion of the apparatus of FIG. 1.

FIG. 1 illustrates a rotatable seal assembly 10 which includes a stator 12, and which also includes a rotor 14 that can rotate at high speed on the stator about an axis 16. This assembly is designed for use in particle beam experiments, wherein a high energy particle beam is directed along a path 18 from a stationary particle accelerator mounted within an extension of the stator 12 to impact a rapidly rotating target mounted on the inside of a housing 20 on the rotor. The particle beam must move through a high vacuum, and therefore the stator and rotor have vacuum chambers 22, 24 with end openings at 22e, 24e that are in communication with each other. The rotor 14 may be rotated at a relatively high speed such as 5,000 rpm, and with the opening such as 22e of considerable diameter such as four inches diameter, so that adjacent rotor and stator parts may move at high velocity with respect to one another. Accordingly, it is desirable to provide a seal against the inflow of ambient or other air into the vacuum chambers, while avoiding direct sliding contact of the stator with the rotor. It also may be noted that, since the housing 20 is centilevered from the rotatably supported portion of the rotor, considerable loading of the rotatable bearing apparatus will be encountered.

The rotor 14 is rotatable mounted on the stator 12 by a pair of ball bearing devices 30, 32 that have outer races fixed to the stator and inner races fixed to the rotor and supported on balls. The bearing devices fix the axial and radial positions of the rotor 14 with respect to the stator 12, although there is slight play in the bearings. The bearings do not seal the communicating vacuum chambers 22, 24 of the stator and rotor, since air could flow along the path indicated at 34 between the balls of the ball bearings, to flow between the ambient atmosphere and the vacuum chambers.

The flow of air along the path 34 between the ambient atmosphere and the vacuum chambers 22, 24 is minimized by the use of a seal member 36 which is mounted on the rotor to rotate therewith, and which has a hole 37 through which the chambers 22, 24 of the stator and rotor communicate. The seal member has a face 38 which lies adjacent to a substantially mating face 40 formed on the stator 12, so that the air gap 42 between them is extremely narrow. It would be possible to allow the seal member, or seal device, to press directly on the stator face 40, but it is desirable in this application to avoid direct sliding contact between them, to avoid friction and vibrations. The faces or surfaces 38, 40 are maintained out of contact with one another, at a very small distance apart, by applying pressurized air through the stator, through holes 44 therein, that form air supply inlets to that the pressure of the air separates the seal device face 38 from the stator face 40 while maintaining the air gap 42 very small such as about 100 microinches wide. A large number of such holes 44, such as sixty of them, are spaced about the axis of rotation 16, which automatically adjusts the orientation and position of the seal device 36 to maintain a substantially uniform air gap 42.

In order to minimize the inflow into the vacuum chambers 22, 24 of the pressured air applied through holes 44 to the space between the faces, a groove 46 is provided at a location radially inside the position of the holes 44. The groove 46 is connected through a passage 48 to the atmosphere to bleed off pressurzed air to the atmosphere. Additional grooves 49 and 50 are provided, which are connected to vacuum pumping devices, to further reduce the amount of air that leaks through the air gap into the stator and rotor chambers 22, 24. The faces 38, 40 on the seal device and stator are formed flat to high precision, as may be tested by the use of optical flats. The air applied through the holes 44 may be applied at a moderate pressure such as 30 psi.

While the sealing device 36 is mounted on the rotor 14 to rotate therewith, it can shift position slightly with respect to the rotor. Air-tight sealing of the seal device 36 to the rotor is accomplished by the use of an elastomeric seal ring 50 such as an O-ring. The seal device has a face-plate portion 52 which forms the face 38 thereon, and also has a pipe-like portion 54 with a groove that holds the seal ring 50. The rotor 14 has a largely cylindrical surface 56 closely surrounding the seal ring 50, so that the seal ring bears thereagainst to seal the rotor to the seal device. The seal ring 50 enables the seal device 36 to move slightly in an axial direction (along the length of axis 16) with respect to the rotor to position its face 38 at a very small distance from the mating face 40 of the stator, and also allows the seal device to tilt slightly in any direction so as to maintain its face 38 parallel to the stator face 40.

The seal device 36 is biased to urge its face 38 towards the stator face 40, by a spring 58 which extends in a ring about the pipe-like portion 54 of the seal device and which has an undulating cross-section. It also may be noted that air pressure builds up behind the face plate portion 52 of the seal device in the same area where the spring 58 is located, to also urge the seal device towards the stator. Thus, while the ball bearings 30, 32 support most, and in fact substantially all, of the weight of the rotor 14 on the stator, the exact axial position of the rotor with respect to the stator does not have to be closely controlled by the bearings. Instead, the seal device 36 which is shiftable with respect to its position on the rotor, both in axial position and in tilt orientation, and which remains sealed to the rotor during such shifting, is the only part that is shifted to provide the required sealing function. Only minimal loading and wear is imposed on the elastomeric O-ring 50, since it moves only a slight distance with respect to the rotor, as compared to the rapid rotation of the rotor with respect to the stator.

It may be noted that in the particular assembly shown in FIG. 1, the rotor 14 is rotated by the use of a turbine wheel 60 fixed thereon, which is turned by air jets emitted from a plate 62 on the stator. The stator plate 62 is fixed to a cylindrical housing part 63 that is fixed to a block 65 of the stator.

The particular arrangement of the seal device 36, which is shiftable while maintaining a seal so as to enable most of the support of the rotor on the stator to be accomplished by an independent bearing such as a ball bearing, can be varied.

For example, the seal device 36 could be shiftably mounted on the stator, so as to move slightly towards and away from a mating face on the rotor. As another example, instead of providing mating faces such as 38 and 40 that are flat and face in (are normal to) an axial direction, it is possible to form a cylindrical face on a seal device and a mating face on one of the members such as the stator or rotor, provided that one of the mating surfaces can shift slightly towards and away from the other, or even to provide mating conical faces. It is even possible to utilize such a sealing device without an air bearing to prevent air flow between rotating and non-rotating surfaces, by utilizing very low contact pressure. In any case, the use of a sealing device to enable slight shifting of mating faces on the rotating and non-rotating portions of an apparatus, so as to enable most of the rotating loads to be carried by separate bearings, can reduce the cost of a rotating sealing arrangement for preventing the passage of fluid, such as air, between the ambient atmosphere and connected chambers of a stator and rotor.

Thus, the invention provides a rotatable seal assembly of the type which includes stator and rotor members having chamber openings in communication with one another during relative rotation, which enables most of the rotational load to be carried by an independent bearing. This is accomplished by the use of seal device which is mounted on one of the members, which has a hole through which the openings in the rotor and stator members are in communication, and which is shiftable in position on the member on which it is mounted while remaining sealed thereto to enable slight movement of a surface on the seal device towards and away from a mating surface on the other member. In one assembly which is described, the seal member is mounted on the rotor and has a pipe-like portion sealed to a largely cylindrical inside surface of the rotor by an O-ring, and with the seal device having a flat face biased towards a corresponding flat face on the stator. An air bearing arrangement is utilized to apply pressured air between the flat surfaces of the seal device and stator to keep them slightly separated during high speed rotation, and a vacuum arrangement is also provided to minimize the passage of the pressure air into vacuum chambers on the rotor and stator.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A rotatable seal assembly comprising:

a stator member having a chamber with an opening extending entirely through said stator member;

a rotor member having a chamber with an opening extending entirely through said rotor member along a first axis;

said rotor member being positioned partially within said stator member;

a bearing assembly operatively connected between said stator member and said rotor member which supports said rotor member in rotation about a predetermined axis with respect to said stator member, and with their openings in communication;

a seal device mounted on said rotor member and having a hole extending centrally therethrough in axial alignment with said opening in said rotor member and through which said openings of said stator member and rotor member communicate, said seal device being shiftable in position on said rotor member while remaining sealed thereto to enable said seal device to move slightly toward and away from said stator member;

said seal device and said stator member having adjacent substantially mating surfaces and positioned to form a gap therebetween;

means supported on said rotor member for biasing said seal device to urge the surface thereon toward the surface of said stator member;

means for directing air under pressure into said gap; and means for preventing air supplied to said gap from entering said openings of said stator and rotor members.

2. The seal assembly described in claim 1, wherein:

said seal device has a flat face extending perpendicular to said axis of rotation and forming said seal device surface, said seal device also having a pipe-like portion positioned on and extending from a side opposite said flat face;

said stator member has a flat face forming said surface thereof and lying opposite and in spaced relation with said flat face of said seal device forming said gap therebetween;

said rotor member has a largely cylindrical inner portion, with said cylindrical inner portion of said rotor member and said pipe-like portion of said seal device positioned so said pipe-like portion lies closely within said cylindrical inner portion; and including an elastic ring-like seal disposed between said inner cylindrical portion of said rotor member and said pipe-like portion of said seal device to form a seal between them.

3. The seal assembly described in claim 2 wherein:

said means for directing air under pressure into said gap includes and air supply means including a plurality of inlets formed in said flat face of said stator member, to force air between said flat faces of said stator and seal device, and an air exit means including a plurality of outlets formed in said flat face of said stator member, said plurality of outlets being at a location closer to said axis of rotation than said air supply inlets to remove air from between said faces.

4. A rotatable vacuum seal assembly comprising:

a stator having a vacuum chamber with an opening extending therethrough;

a rotor having a vacuum chamber with a substantially centrally located opening;

means for rotatable mounting said rotor adjacent to and partially within said stator and with their vacuum chamber openings in communication, including a bearing assembly connected to said stator and rotor to rotatably support the rotor partially within the stator in rotation about a predetermined axis, said mounting means additionally including a seal device with a hole therein axially aligned with said rotor and communicating with said openings and which is mounted on said rotor and which has an air bearing surface facing said stator and substantially perpendicular to said predetermined axis;

said stator having an air bearing surface adjacent to and facing the air bearing surface of the seal device, said air bearing surfaces being positioned in spaced relation to form a gap therebetween, at least one pressured air inlet in said stator surface for applying pressured air to a portion of the gap between said surfaces, and a least one vacuum inlet in said stator surface located closer to said predetermined axis than said air inlet for applying a vacuum to another portion of said gap to intercept air flowing toward said openings;

said seal device being shiftable on said rotor while remaining sealed thereto, and said mounting means also including means for resiliently urging said seal device to move its air bearing surface toward said stator air bearing surface.

5. The seal assembly described in claim 4 wherein:

said bearing assembly prevents substantial axial and radial movement of the rotor with respect to the stator; and said rotor has a largely cylindrical inside surface, said seal device includes a pipe-like portion located on an opposite side from said air bearing surface and lying within said cylindrical inside surface, and said mounting means includes an elastomeric seal lying between said cylindrical inside surface of said rotor and said pipe-like portion of said seal device to form an air tight seal between them.

6. The seal assembly of claims 1 or 4 wherein said bearing assembly consists of at least one ball bearing assembly having one race member mounted on said stator and having another race member mounted on said rotor.

7. In an apparatus wherein a charged-particle beam in vacuum strikes a rapidly rotating target, the improvement comprising a rotatable vacuum seal assembly on which the target is mounted and through which the charged-particle beam passes, said rotatable vacuum seal assembly comprising:

a stator member having an opening extending therethrough;

a rotor member having an opening extending therethrough;

a bearing assembly for rotatably mounting said rotor member partially within said stator member about a predetermined axis of rotation;

a seal device having an opening therein and positioned intermediate said stator and rotor member so as to define a gap between said seal device and said stator member, said seal device opening and said rotor member opening each having a central axis in alignment with said axis of rotation and in open communication with said stator member opening, said seal device having a substantially flat face substantially perpendicular to said axis of rotation and facing said stator member and a pipe-like section located on a side opposite said flat face;

sealing means located between said pipe-like section of said seal device and an inner surface of said rotor member;

means positioned between said rotor member and said seal device for biasing said seal device towards said stator member;

means for supplying air under pressure to a portion of said gap between said stator member and said flat face of said seal member; and vacuum means located closer to said opening in said stator member than said air supplying means to prevent passage of air into said openings.

8. The rotatable vacuum seal assembly of claim 7, wherein said opening in said stator member has a central axis located at an angle with respect to said axis of rotation of said rotor member.

* * * * *